(12) United States Patent
Copeland et al.

(10) Patent No.: US 7,202,790 B2
(45) Date of Patent: Apr. 10, 2007

(54) TECHNIQUES FOR TUNING AN ANTENNA TO DIFFERENT OPERATING FREQUENCIES

(75) Inventors: Richard L. Copeland, Lake Worth, FL (US); Gary Mark Shafer, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 154 days.

(21) Appl. No.: 10/917,752

(22) Filed: Aug. 13, 2004

(65) Prior Publication Data

US 2006/0033624 A1 Feb. 16, 2006

(51) Int. Cl.
*G08B 13/14* (2006.01)

(52) U.S. Cl. .............. 340/572.7; 340/572.8; 343/868; 343/748; 343/745

(58) Field of Classification Search .......... 340/572.7, 340/572.8; 235/492; 343/868, 748, 750, 343/795, 745, 815, 741, 703
See application file for complete search history.

(56) References Cited

U.S. PATENT DOCUMENTS

| | | | | |
|---|---|---|---|---|
| 4,560,445 A * | 12/1985 | Hoover et al. | ............... | 205/126 |
| 5,109,217 A * | 4/1992 | Siikarla et al. | .......... | 340/572.1 |
| 5,337,063 A * | 8/1994 | Takahira | ..................... | 343/741 |
| 6,104,311 A * | 8/2000 | Lastinger | .................. | 340/10.51 |
| 6,281,794 B1 * | 8/2001 | Duan et al. | .............. | 340/572.1 |
| 6,480,110 B2 * | 11/2002 | Lee et al. | ................ | 340/572.5 |
| 6,535,175 B2 * | 3/2003 | Brady et al. | ................ | 343/795 |
| 6,696,952 B2 * | 2/2004 | Zirbes | ..................... | 340/572.1 |
| 6,806,812 B1 * | 10/2004 | Cathey | .................... | 340/572.7 |

* cited by examiner

*Primary Examiner*—Daniel Wu
*Assistant Examiner*—Travis R. Hunnings
(74) *Attorney, Agent, or Firm*—Kacvinsky LLC

(57) ABSTRACT

Techniques for tuning an antenna to different operating frequencies are described. An apparatus includes a security tag with a substrate having a surface, a lead frame to mount on the surface and connect to an antenna, and an integrated circuit to connect to the lead frame. The antenna may be disposed on the surface, and may comprise a first antenna portion and a second antenna portion. The first antenna portion may connect to the first side and the second antenna portion may connect to the second side. The antenna may be tuned to an operating frequency by modifying a first length for the first antenna portion and a second length for the second antenna portion after the antenna portions are disposed on the surface. Each portion has a first antenna end and a second antenna end, the first antenna end to connect to the lead frame, and the first antenna portion may form an inwardly spiral pattern from the integrated circuit in a first direction, and the second antenna portion may form an inwardly spiral pattern from the integrated circuit in a second direction. Other embodiments are described and claimed.

30 Claims, 5 Drawing Sheets

TECHNIQUES FOR TUNING AN ANTENNA TO DIFFERENT OPERATING FREQUENCIES

BACKGROUND

A radio-frequency identification (RFID) system may be used for a number of applications, such as managing inventory, electronic access control, security systems, automatic identification of cars on toll roads, electronic article surveillance (EAS), and so forth. A RFID system may comprise a RFID reader and a RFID device. The RFID reader may transmit a radio-frequency carrier signal to the RFID device. The RFID device may respond to the carrier signal with a data signal encoded with information stored by the RFID device.

A RFID device typically includes an antenna to communicate signals between the RFID device and the RFID reader. The antenna should be tuned to operate within a predetermined operating frequency or range of frequencies. Improved techniques to tune an antenna may increase the performance of an RFID system, as well as reduce associated costs. Accordingly, there may be need for improved tunable antennas in an RFID system.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Figure 1:
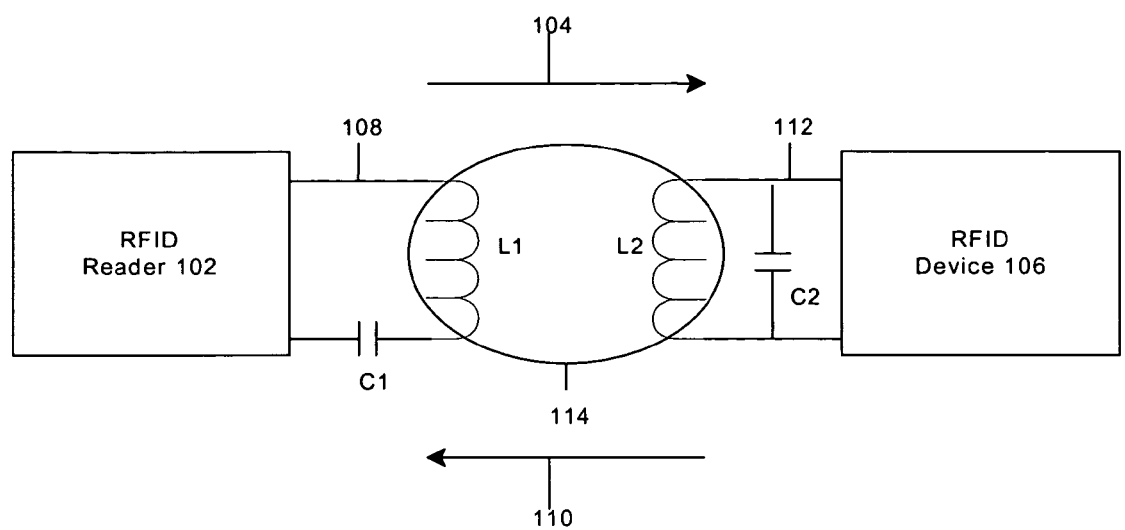
FIG. 1 illustrates a block diagram of a system in accordance with one embodiment.

The embodiments may be directed to an RFID system in general. More particularly, the embodiments may be directed to a RFID device, such as a security tag. The RFID device may include a semiconductor integrated circuit (IC) and a tunable antenna. The tunable antenna may be tuned to a desired operating frequency by adjusting the length of the antenna. The range of operating frequencies may vary, although the embodiments may be particularly useful for ultra-high frequency (UHF) spectrum. Depending upon the application and the size of the area available for the antenna, the antenna may be tuned within several hundred Megahertz (MHz) or higher, such as 868–950 MHz, for example. In one embodiment, for example, the tunable antenna may be tuned to operate within an RFID operating frequency, such as the 868 MHz band used in Europe, the 915 MHz Industrial, Scientific and Medical (ISM) band used in the United States, and the 950 MHz band proposed for Japan. It may be appreciated that these operating frequencies are given by way of example only, and the embodiments are not limited in this context.

In one embodiment, for example, the tunable antenna may have a unique antenna geometry of an inwardly spiral pattern useful for RFID applications or EAS applications. The inwardly spiral pattern may nest the antenna traces thereby bringing the traces back towards the origin. This may result in an antenna similar in functionality as a conventional half-wave dipole antenna, but with a smaller overall size. For example, the size of a conventional half-wave dipole antenna at 915 MHz would be approximately 16.4 centimeters (cm) long. By way of contrast, some embodiments may offer the same performance as the conventional half-wave dipole antenna at the 915 MHz operating frequency with a shorter length of approximately 3.81 cm. Furthermore, the ends of the antenna traces may be modified to tune the antenna to a desired operating frequency. Since the ends of the antenna traces are inward from the perimeter of the antenna, the tuning may be accomplished without changing the geometry of the antenna.

Numerous specific details may be set forth herein to provide a thorough understanding of the embodiments. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a first system in accordance with one embodiment. FIG. 1 is a block diagram of an RFID system 100. In one embodiment, for example, RFID system 100 may be configured to operate using an RFID device having an operating frequency in the 868 MHz band, the 915 MHz band, and the 950 MHz band. RFID system 100, however, may also be configured to operate using other portions of the RF spectrum as desired for a given implementation. The embodiments are not limited in this context.

As shown in FIG. 1, RFID system 100 may comprise a plurality of nodes. The term "node" as used herein may refer to a system, element, module, component, board or device that may process a signal representing information. The signal may be, for example, an electrical signal, optical signal, acoustical signal, chemical signal, and so forth. The embodiments are not limited in this context.

As shown in FIG. 1, RFID system 100 may comprise a RFID reader 102 and a RFID device 106. Although FIG. 1 shows a limited number of nodes, it can be appreciated that any number of nodes may be used in RFID system 100. The embodiments are not limited in this context.

In one embodiment, RFID system 100 may comprise RFID reader 102. RFID reader 102 may include a tuned circuit 108 comprising an inductor L1 and a capacitor C1 connected in series. RFID reader 102 may produce continuous wave (CW) RF power across the tuned circuit 108. This CW RF power may be electro-magnetically coupled by alternating current action to a parallel resonant circuit antenna 112 of RFID device 106. The coupled CW RF electromagnetic power may be generally represented by the numeral 114.

In one embodiment, RFID system 100 may comprise RFID device 106. RFID device 106 may include a power converter circuit that converts some of the coupled CW RF electro-magnetic power 114 into direct current power for use by the logic circuits of the semiconductor IC used to implement the RFID operations for RFID device 106.

In one embodiment, RFID device 106 may comprise a RFID security tag. An RFID security tag may include memory to store RFID information, and may communicate the stored information in response to an interrogation signal, such as interrogation signals 104. RFID information may include any type of information capable of being stored in a memory used by RFID device 106. Examples of RFID information may include a unique tag identifier, a unique system identifier, an identifier for the monitored object, and so forth. The types and amount of RFID information are not limited in this context.

In one embodiment, RFID device 106 may comprise a passive RFID security tag. A passive RFID security tag does not use an external power source, but rather uses interrogation signals 104 as a power source. RFID device 106 may be activated by a direct current voltage that is developed as a result of rectifying the incoming RF carrier signal comprising interrogation signals 104. Once RFID device 106 is activated, it may then transmit the information stored in its memory register via response signals 110.

In general operation, when antenna 112 of RFID device 106 is in proximity to tuned circuit 108 of RFID reader 102, it develops an AC voltage across antenna 112. The AC voltage across antenna 112 is rectified and when the rectified voltage becomes sufficient enough to activate RFID device 106, RFID device 106 may start to send stored data in its memory register by modulating interrogation signals 104 of RFID reader 102 to form response signals 110. RFID reader 102 may receive response signals 110 and converts them into a detected serial data word bitstream of on/off pulses representative of the information from RFID device 106.

Figure 2:
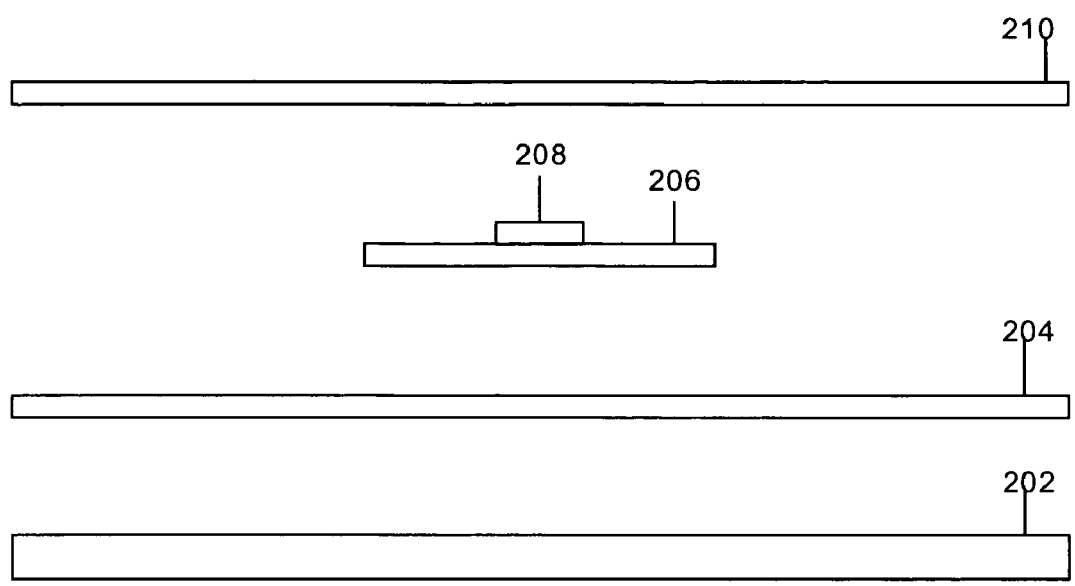
FIG. 2 illustrates a side view of a security tag in accordance with one embodiment.

FIG. 2 illustrates a side view for a security tag in accordance with one embodiment. FIG. 2 illustrates a security tag 200. Security tag 200 may be representative of, for example, RFID device 106. As shown in FIG. 2, security tag 200 may include a substrate 202, an antenna 204, a lead frame 206, a semiconductor IC 208, and a covering material 210. Although FIG. 2 illustrates a limited number of elements, it may be appreciated that more or less elements may be used for security tag 200. For example, an adhesive and release liner may be added to security tag 200 to assist in attaching security tag 200 to an object to be monitored. The embodiments are not limited in this context.

In one embodiment, security tag 200 may include substrate 202. Substrate 202 may comprise any type of material suitable for mounting antenna 204, lead frame 206, and IC 208. For example, material for substrate 202 may include base paper, polyethylene, polyester, and so forth. The particular material implemented for substrate 202 may impact the RF performance of security tag 200. More particularly, the dielectric constant and the loss tangent may characterize the dielectric properties of an appropriate substrate material for use as substrate 202.

In general, a higher dielectric constant may cause a larger frequency shift of an antenna when compared to free space with no substrate present. Although it may be possible to re-tune the antenna to the original center frequency by physically changing the antenna pattern, it may be desirable to have the lowest dielectric constant possible for the label substrate material to improve the free-space read range. The term "read range" may refer to the communication operating distance between RFID reader 102 and RFID device 106. An example of a read range for security tag 200 may comprise 1–3 meters, although the embodiments are not limited in this context. The loss tangent may characterize the absorption of RF energy by the dielectric. The absorbed energy may be lost as heat and may be unavailable for use by IC 208. The lost energy may be same as reducing the transmitted power and may reduce the read range accordingly. Consequently, it may be desirable to have the lowest loss tangent possible in substrate 202 since it cannot be "tuned out" by adjusting antenna 204. The total frequency shift and RF loss may depend also on the thickness of substrate 202. As the thickness increases, the shift and loss may also increase.

In one embodiment, for example, substrate 202 may be implemented using base paper. The base paper may have a dielectric constant of 3.3, and a loss tangent of 0.135. The base paper may be relatively lossy at 900 MHz. The embodiments are not limited in this context.

In one embodiment, security tag 200 may include IC 208. IC 208 may comprise a semiconductor IC, such as an RFID chip or application specific integrated circuit (ASIC) ("RFID chip"). RFID chip 208 may include, for example, an RF or alternating current (AC) rectifier that converts RF or AC voltage to DC voltage, a modulation circuit that is used to transmit stored data to the RFID reader, a memory circuit that stores information, and a logic circuit that controls overall function of the device. In one embodiment, for example, RFID chip 208 may be implemented using the I-CODE or U-CODE High Frequency Smart Label (HSL) RFID ASIC made by Philips Semiconductor. The embodiments, however, are not limited in this context.

In one embodiment, security tag 200 may include lead frame 206. A lead frame may be an element of leaded packages, such as Quad Flat Pack (QFP), Small Outline Integrated Circuit (SOIC), Plastic Leaded Chip Carrier (PLCC), and so forth. Lead frame 206 may include a die mounting paddle or flag, and multiple lead fingers. The die paddle primarily serves to mechanically support the die during package manufacture. The lead fingers connect the die to the circuitry external to the package. One end of each lead finger is typically connected to a bond pad on the die by wire bonds or tape automated bonds. The other end of each lead finger is the lead, which is mechanically and electrically connected to a substrate or circuit board. Lead frame 206 may be constructed from sheet metal by stamping or etching, often followed by a finish such as plating, downset and taping. In one embodiment, for example, lead frame 206 may be implemented using a Sensormatic EAS Microlabel lead frame made by Sensormatic Corporation, for example. The embodiments, however, are not limited in this context.

In one embodiment, security tag 200 may include covering material 210. Covering material 210 may be cover stock material applied to the top of a finished security tag. As with substrate 202, covering material 210 may also impact the RF performance of RFID device 106. In one embodiment, for example, covering material 210 may be implemented using cover stock material having a dielectric constant of 3.8 and a loss tangent of 0.115. The embodiments are not limited in this context.

In one embodiment, security tag 200 may include antenna 204. Antenna 204 may be representative of, for example, antenna 112 of RFID device 106. Antenna 204 may be formed by a parallel resonant LC circuit, where L is inductance and C is capacitance. In one embodiment, for example, antenna 204 may be a tunable antenna. To increase read range, antenna 204 may be tuned to the carrier signal so that the voltage across the antenna circuit is maximized. The degree of preciseness of the tuning circuit is related to the spectrum width of the carrier signal transmitted by transmitter 102. For example, in the United States the Federal Communication Commission may regulate one band of the RFID security tag spectrum to 915 MHz. Therefore, transmitter 102 should transmit interrogation signals 104 at approximately 915 MHz. To receive interrogation signals 104, antenna 204 should be narrowly tuned to the 915 MHz signal. For 915 MHz applications, the inductance L is typically formed by printed, etched, or wired circuit. A fixed chip capacitor, silicon capacitor, or parasitic capacitor that is formed by RFID device 106 itself is typically used for the capacitor. These L and C values have wide variations in tolerance. Therefore, antenna 204 may need to be tuned to compensate for the tolerance variations of these L and C components. The tuning of an LC resonant circuit can be accomplished by either adjusting the L or C component values.

In one embodiment, RFID device 106 may use an induced antenna coil voltage for operation. This induced AC voltage may be rectified and results in a DC voltage. As the DC voltage reaches a certain level, RFID device 106 may begin operating. By providing an energizing RF signal via transmitter 102, RFID reader 102 can communicate with a remotely located RFID device 106 that has no external power source such as a battery. Since the energizing and communication between the RFID reader and RFID device 106 is accomplished through antenna 204, it may be important for antenna 204 to be tuned for improved RFID applications. An RF signal can be radiated or received effectively if the linear dimension of the antenna is comparable with the wavelength of the operating frequency. The linear dimension, however, may be greater than the available area of for antenna 204. Therefore, it may be difficult to form a true full size antenna in a limited space, and this is true for most RFID applications. Accordingly, RFID device 106 may use a smaller LC loop antenna circuit that is arranged to resonate at a given operating frequency. An LC loop antenna may comprise, for example, a spiral coil and a capacitor. The spiral coil may be formed by n-turns of wire, or n-turns of printed or etched inductor on dielectric substrate.

In one embodiment, antenna 204 may be designed so that the complex conjugate of the overall antenna would match impedance to the complex impedance of lead frame 206 and IC 208 at the desired operating frequency, such as 915 MHz, for example. When RFID device 106 is placed on an object to be monitored, however, the resulting operating frequency may change. Each object may have a substrate material with dielectric properties affecting the RF performance of antenna 204. As with substrate 202, the object substrate may cause frequency shifts and RF losses determined by the dielectric constant, loss tangent, and material thickness. Examples of different object substrates may include chip board which is material used for item-level cartons, corrugated fiber board which is material used for corrugated boxes, video cassette and DVD cases, glass, metal, and so forth. Each object substrate may have a significant affect on the read range for RFID device 106.

In one embodiment, antenna 204 may be tunable to compensate for such variations. Since the dielectric constant for many materials is greater than one, the operating frequency is typically lowered when security tag 200 is attached to an object substrate. In order to establish the original frequency, antenna 204 must be altered in some manner, otherwise detection performance and read range may be reduced. In one embodiment, antenna 204 may be altered by trimming the ends of antenna 204. The trimming may be accomplished by severing the antenna conductor and isolating the resultant trimmed antenna segment from the ends that were cut away. The trimmed ends do not necessarily have to be removed to allow the tuning operation. Consequently, continuous tuning of antenna 204 to the desired operating frequency may be possible to allow operation of a RFID device 106 when RFID device 106 is attached to different objects. RFID device 106 in general, and antenna 204 in particular, may be described in more detail with reference to FIGS. 3–5.

Figure 3:
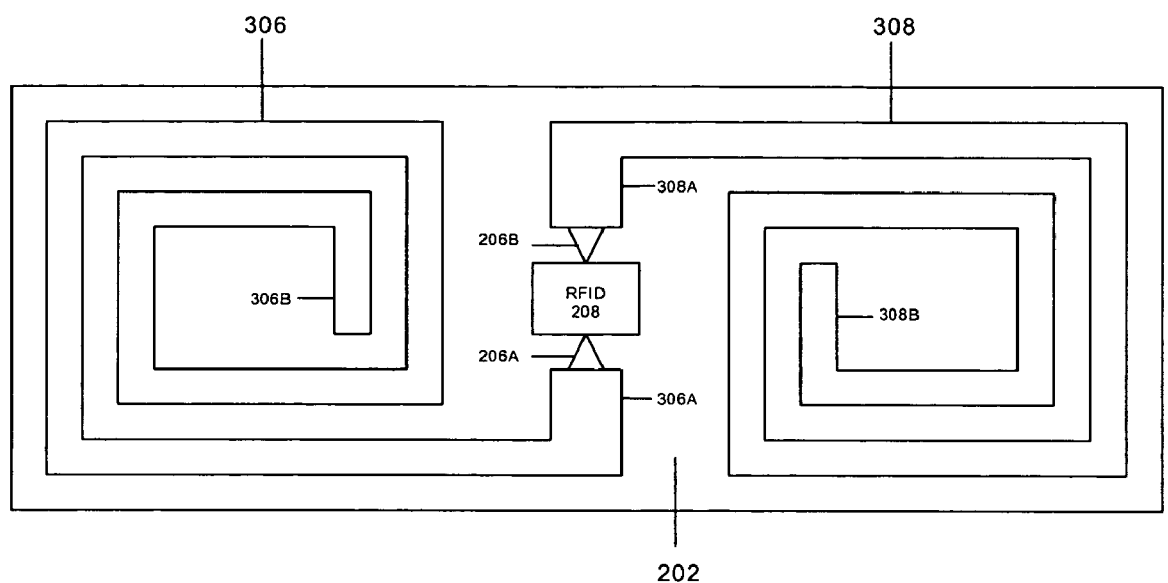
FIG. 3 illustrates a top view of a security tag with an antenna in accordance with one embodiment.

FIG. 3 illustrates a top view of a partial security tag with an antenna in accordance with one embodiment. FIG. 3 illustrates a top view of portions of security tag 200. As shown in FIG. 3, security tag 200 may comprise antenna 204 disposed upon substrate 202. Substrate 202 may be substantially rectangular in shape, for example. Antenna 204 may be disposed on substrate 202 by die-cutting the label antenna pattern onto substrate 202. Substrate 202 may comprise, for example, paper-back aluminum foil. RFID chip 208 may be connected to lead frame 206 by ultrasonically bonding lead frame 206 to the conductive pads on RFID chip 208. RFID chip 208 and lead frame 206 may be placed directly in the geometric center of the dielectric substrate material of substrate 202. The ends of lead frame 206 may be physically and electrically bonded to the foil antenna pattern of antenna 204. Covering material 210 (not shown) may then be applied over the entire top surface of security tag 200 to protect the assembly and provide a surface for printing, if desired.

In one embodiment, for example, antenna 204 may comprise multiple antenna portions. For example, antenna 204 may comprise a first antenna portion 206 and a second antenna portion 208. First antenna portion 306 may be connected to a first side 206A of lead frame 206. Second antenna portion 308 may be connected to a second side 206B of lead frame 206.

As shown in FIG. 3, first antenna portion 306 may have a first antenna end 306A and a second antenna end 306B. Similarly, second antenna portion 308 may have a first antenna end 308A and a second antenna end 308B. In one embodiment, for example, first antenna end 306A of first antenna portion 306 may be connected to lead frame 206A. First antenna portion 306 may be disposed on substrate 202 to form an inwardly spiral pattern from RFID chip 208 in a first direction, with second antenna end 306B to terminate on the inner loop of the inwardly spiral pattern. Similarly, first antenna end 308A of second antenna portion 308 may be connected to lead frame 206B. Second antenna portion 308 may be disposed on substrate 202 to form an inwardly spiral pattern from RFID chip 208 in a second direction, with second antenna end 308B to terminate on the inner loop of the inwardly spiral pattern. In one embodiment, the first and second directions may form counter-clock wise and clock wise spirals, respectively. The embodiments, however, are not necessarily limited in this context.

In one embodiment, the antenna geometry of antenna 204 may traverse around the perimeter of substrate 202 and spiral inwardly. The inwardly directed spiral antenna pattern may provide several advantages. For example, the ends of antenna 204 may be placed well inside the perimeter of substrate 202. Placing the ends of antenna 204 within the perimeter of substrate 202 may allow the ends to be trimmed without changing the amount of area used by antenna 204. In another example, the Q of antenna 204 may be optimized so that the response of RFID device 106 only varies by approximately −3 dB at the ISM band limits. Using the Chu-Harrington limit of $Q=1/(ka)^3+1/(ka)$, where $k=2\pi/\lambda$ and "a" is a characteristic dimension of antenna 204 so that a sphere of radius "a" could just enclose RFID device 106, for a high Q then "ka" should be <<1. Therefore, Q should be maximized in order to minimize "a" to within the operating frequency band limits.

In one embodiment, antenna 204 may be tuned to a desired operating frequency by modifying a first length for first antenna portion 306, and a second length for second antenna portion 308, after these antenna portions are disposed on substrate 202. For example, each antenna portion may be divided into multiple antenna segments at multiple segment points. The first and second antenna lengths may be modified by electrically isolating at least a first antenna segment from a second antenna segment. The antenna length may be modified by severing each antenna portion at one of multiple segment points, with each segment point to correspond to an operating frequency for antenna 204. Dividing first antenna portion 306 and second antenna portion 308 into multiple antenna segments results in shortening the length of each antenna portion, and thereby effectively changes the total inductance of antenna 204. The antenna segments and segment points may be described in more detail with reference to FIG. 4.

Figure 4:
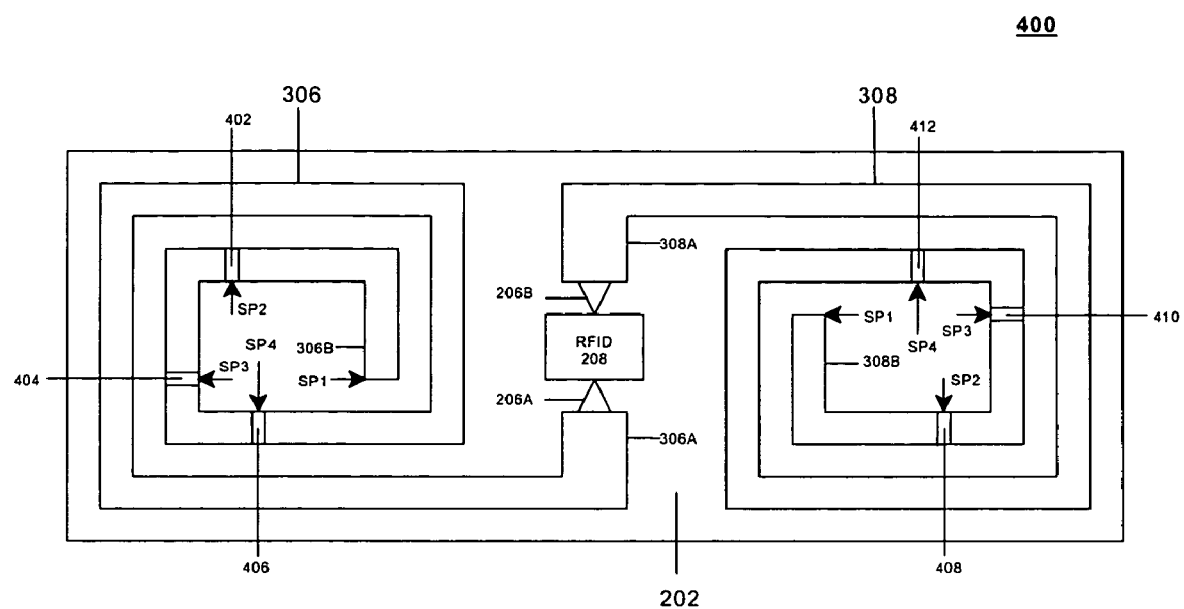
FIG. 4 illustrates a top view of a security tag with an antenna having segment points in accordance with one embodiment.

FIG. 4 illustrates a diagram of a security tag with an antenna with segment points in accordance with one embodiment. FIG. 4 illustrates a top view of portions of security tag 200 with multiple segment points (SP). Antenna 204 may be tuned to a desired operating frequency by modifying a first length for first antenna portion 306, and a second length for second antenna portion 308, after these antenna portions are disposed on substrate 202. For example, each antenna portion may be divided into multiple antenna segments at multiple segment points SP1–SP4. The first and second antenna lengths may be modified by electrically isolating at least a first antenna segment from a second antenna segment. The antenna length may be modified by severing each antenna portion at one of multiple segment points, with each segment to correspond to an operating frequency for antenna 204. The severing may be achieved in a number of different ways, such as cutting or punching the antenna trace at a given segment point SP1–SP4. The severing may create a slot at the segment point, such as slots 402–412.

In one embodiment, each segment point may correspond to an operating frequency for antenna 204. FIG. 4 illustrates four (4) segments points SP1–SP4 by way of example. SP1 may tune antenna 204 for an operating frequency of approximately 868 MHz when RFID device 106 is in free space and unattached to an object. SP2 may tune antenna 204 for an operating frequency of approximately 915 MHz when RFID device 106 is in free space and unattached to an object. SP3 may tune antenna 204 for an operating frequency of approximately 915 MHz when RFID device 106 is attached to a VHS cassette housing. SP4 may tune antenna 204 for an operating frequency of approximately 915 MHz when RFID device 106 is attached to a chip board. It may be appreciated that the number of segment points and corresponding operating frequencies for antenna 204 may vary according to a given implementation. The embodiments are not limited in this context.

Figure 5:
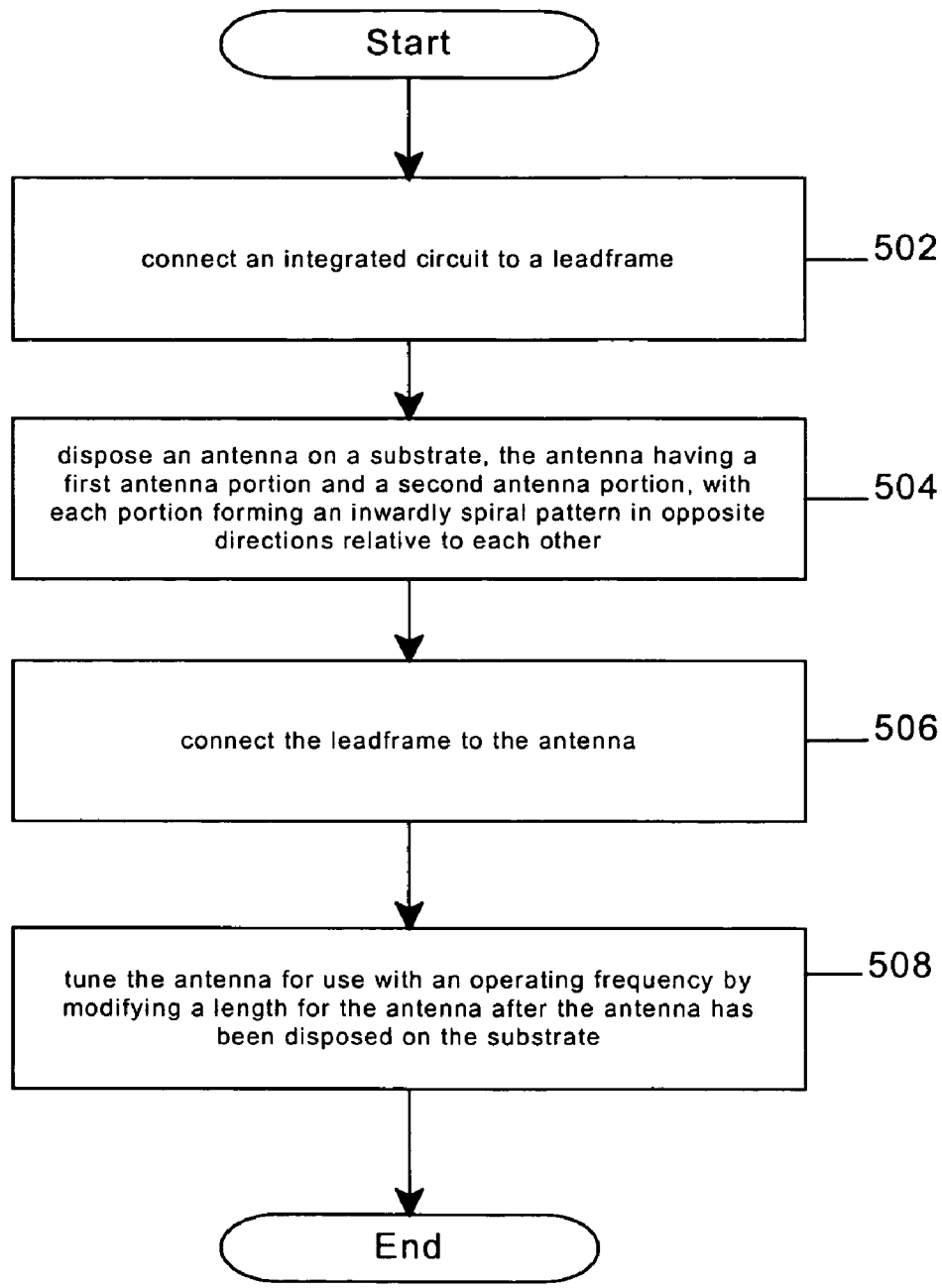
FIG. 5 illustrates a block flow diagram in accordance with one embodiment.

FIG. 5 illustrates a block flow diagram in accordance with one embodiment. Security tag 200 may be developed in a number of different ways. FIG. 5 illustrates a block flow diagram 500, which is an example of one way to develop security tag 200. As shown in FIG. 5, an integrated circuit may be connected to a lead frame at block 502. An antenna may be disposed on a substrate at block 504. The lead frame may be connected to the antenna at block 506.

In one embodiment, the antenna may be tuned for use with an operating frequency at block 508. The tuning may be performed by modifying a length for the antenna. The length may be modified by severing the antenna into multiple antenna segments at a segment point corresponding to the operating frequency. The severing may electrically disconnect a first antenna segment from a second antenna segment, thereby effectively shortening the length of the antenna.

As described above, the unique antenna geometry of an inwardly spiral pattern may be useful for RFID applications when connected to an RFID chip. The unique antenna geometry shown in FIGS. 3 and 4, however, may also be useful for an EAS system. In one embodiment, for example, RFID chip 208 may be replaced with a diode or other non-linear passive device where the voltage and current characteristics are non-linear. The antenna for the diode or other passive non-linear EAS device may have the same geometry as shown in FIGS. 3 and 4, and may be trimmed to tune the antenna to the operating frequency of the transmitter used to transmit interrogation signals for the EAS system. Similar to RFID system 100, the range of operating frequencies may vary, although the embodiments may be particularly useful for UHF spectrum, such as 868–950 MHz, for example. The embodiments are not limited in this context.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an ASIC, Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

What is claimed is:

1. A security tag, comprising:
a substrate having a surface;

a lead frame to mount on said surface, said lead frame having a first side and a second side;
an integrated circuit to connect to said lead frame;
an antenna disposed on said surface, said antenna to comprise a first antenna portion and a second antenna portion, said first antenna portion to connect to said first side and said second antenna portion to connect to said second side, wherein said antenna is tuned to an operating frequency by modifying a first length for said first antenna portion and a second length for said second antenna portion after said antenna portions are disposed on said surface;
wherein each portion has a first antenna end and a second antenna end, said first antenna end to connect to said lead frame, said first antenna portion to form an inwardly spiral pattern from said integrated circuit in a first direction, and said second antenna portion to form an inwardly spiral pattern from said integrated circuit in a second direction, wherein said first and second directions are in opposite directions;
wherein each antenna portion may be divided into multiple antenna segments at multiple segment points and each segment point corresponds to an operating frequency for said antenna; and
wherein each segment point for a corresponding operating frequency may vary according to a substrate and object.

2. The security tag of claim 1, wherein said first and second antenna lengths are modified by electrically isolating at least a first antenna segment from a second antenna segment.

3. The security tag of claim 2, wherein said antenna length is modified by severing said antenna portion at a segment point.

4. The security tag of claim 3, wherein said label is to be attached to an object.

5. The security tag of claim 1, wherein said operating frequency is within a range of 868 Megahertz to 950 Megahertz.

6. The security tag of claim 1, further comprising a covering material to cover said integrated circuit, said lead frame, said antenna, and said substrate.

7. The security tag of claim 1, wherein said integrated circuit is a semiconductor integrated circuit having electronic logic circuits to receive, store and transmit information.

8. The security tag of claim 1, wherein said integrated circuit is a radio-frequency identification chip.

9. The security tag of claim 1, further comprising an adhesive and release liner to attach said to an object.

10. The security tag of claim 1, wherein said antenna has a length of approximately 3.81 centimeters when tuned to an operating frequency of approximately 915 Megahertz.

11. A system, comprising:
a radio-frequency identification reader to generate interrogation signals;
a security tag to receive said interrogation signal and transmit a response signal, said security tag comprising:
a substrate having a surface;
a lead frame to mount on said surface, said lead frame having a first side and a second side;
an integrated circuit to connect to said lead frame;
an antenna disposed on said surface, said antenna to comprise a first antenna portion and a second antenna portion, said first antenna portion to connect to said first side and said second antenna portion to connect to said second side, wherein said antenna is tuned to an operating frequency by modifying a first length for said first antenna portion and a second length for said second antenna portion after said antenna portions are disposed on said surface;
wherein each portion has a first antenna end and a second antenna end, said first antenna end to connect to said lead frame, said first antenna portion to form an inwardly spiral pattern from said integrated circuit in a first direction, and said second antenna portion to form an inwardly spiral pattern from said integrated circuit in a second direction, wherein said first and second directions are in opposite directions;
wherein each antenna portion may be divided into multiple antenna segments at multiple segment points and each segment point corresponds to an operating frequency for said antenna; and
wherein each segment point for a corresponding operating frequency may vary according to a substrate and object.

12. The system of claim 11, wherein said first and second antenna lengths are modified by electrically isolating at least a first antenna segment from a second antenna segment.

13. The system of claim 12, wherein said antenna length is modified by severing said antenna portion at a segment point.

14. The system of claim 13, wherein said label is to be attached to an object.

15. The system of claim 11, wherein said operating frequency is within a range of 868 Megahertz to 950 Megahertz.

16. The system of claim 11, further comprising a covering material to cover said integrated circuit, said lead frame, said antenna, and said substrate.

17. The system of claim 11, wherein said integrated circuit is a semiconductor integrated circuit having electronic logic circuits to receive, store and transmit information.

18. The system of claim 11, wherein said integrated circuit is a radio-frequency identification chip.

19. The system of claim 11, further comprising an adhesive and release liner to attach said label to an object.

20. The system of claim 11, wherein said antenna has a length of approximately 3.81 centimeters when tuned to an operating frequency of approximately 915 Megahertz.

21. A method, comprising:
connecting an integrated circuit to a lead frame;
disposing an antenna on a substrate, said antenna having a first antenna portion and a second antenna portion, with each portion forming an inwardly spiral pattern in opposite directions relative to each other;
connecting said lead frame to said antenna;
tuning said antenna for use with an operating frequency by modifying a length for said antenna after said antenna has been disposed on said substrate;
wherein said tuning further comprises severing said antenna into multiple antenna segments at a segment point corresponding to said operating frequency; and
wherein each segment point for a corresponding operating frequency may vary according to a substrate and object.

22. The method of claim 21, further comprising covering said integrated circuit, said lead frame, said antenna and said substrate with a covering material.

23. The method of claim 22 wherein said severing electrically disconnects a first antenna segment from a second antenna segment.

24. A security tag, comprising:
a substrate having a surface;
a lead frame to mount on said surface, said lead frame having a first side and a second side;

a passive non-linear device;

an antenna disposed on said surface, said antenna to comprise a first antenna portion and a second antenna portion, said first antenna portion to connect to said first side and said second antenna portion to connect to said second side, wherein said antenna is tuned to an operating frequency by modifying a first length for said first antenna portion and a second length for said second antenna portion after said antenna portions are disposed on said surface;

wherein each portion has a first antenna end and a second antenna end, said first antenna end to connect to said lead frame, said first antenna portion to form an inwardly spiral pattern from said integrated circuit in a first direction, and said second antenna portion to form an inwardly spiral pattern from said integrated circuit in a second direction, wherein said first and second directions are in opposite directions;

wherein each antenna portion may be divided into multiple antenna segments at multiple segment points and each segment point corresponds to an operating frequency for said antenna; and wherein each segment point for a corresponding operating frequency may vary according to a substrate and object.

25. The security tag of claim 24, wherein said first and second antenna lengths are modified by electrically isolating at least a first antenna segment from a second antenna segment.

26. The security tag of claim 25, wherein said antenna length is modified by severing said antenna portion at a segment point.

27. The security tag of claim 26, wherein said label is to be attached to an object.

28. The security tag of claim 24, wherein said operating frequency is within a range of 868 Megahertz to 950 Megahertz.

29. The security tag of claim 24, further comprising a covering material to cover said passive non-linear device, said lead frame, said antenna, and said substrate.

30. The security tag of claim 24, wherein said passive non-linear device comprises a diode.

* * * * *